US012580108B2

(12) United States Patent
Kim et al.

(10) Patent No.: US 12,580,108 B2
(45) Date of Patent: Mar. 17, 2026

(54) MAGNETIC CORE AND MAGNETIC ELEMENT COMPRISING SAME

(71) Applicant: LG INNOTEK CO., LTD., Seoul (KR)

(72) Inventors: Sung San Kim, Seoul (KR); Soo Kwang Yoon, Seoul (KR); Seok Bae, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 778 days.

(21) Appl. No.: 17/905,240

(22) PCT Filed: Feb. 23, 2021

(86) PCT No.: PCT/KR2021/002236
§ 371 (c)(1),
(2) Date: Aug. 29, 2022

(87) PCT Pub. No.: WO2021/172838
PCT Pub. Date: Sep. 2, 2021

(65) Prior Publication Data

US 2023/0136055 A1 May 4, 2023

(30) Foreign Application Priority Data

Feb. 28, 2020 (KR) ........................ 10-2020-0025405

(51) Int. Cl.
*H01F 3/14* (2006.01)
*H01F 27/02* (2006.01)
*H01F 27/24* (2006.01)

(52) U.S. Cl.
CPC ............. *H01F 3/14* (2013.01); *H01F 27/022* (2013.01); *H01F 27/24* (2013.01)

(58) Field of Classification Search
CPC ........... H01F 3/14; H01F 27/24; H01F 27/263
See application file for complete search history.

(56) References Cited

U.S. PATENT DOCUMENTS

2017/0221625 A1 8/2017 Sullivan et al.
2018/0358157 A1 12/2018 Xu et al.

FOREIGN PATENT DOCUMENTS

JP 2004-79640 A 3/2004
JP 2004235462 A * 8/2004

(Continued)

OTHER PUBLICATIONS

Office Action dated Jan. 18, 2024 in Korean Application No. 10-2020-0025405.

(Continued)

*Primary Examiner* — Lincoln D Donovan
(74) *Attorney, Agent, or Firm* — Saliwanchik, Lloyd & Eisenschenk

(57) ABSTRACT

The present invention relates to a magnetic core capable of precisely maintaining the size of a gap, and to a magnetic element comprising same. A magnetic core according to one embodiment comprises: an upper core having at least a first outer leg and a second outer leg; a lower core having at least a third outer leg facing the first outer leg and a fourth outer leg facing the second outer leg; outer leg gap parts disposed between the first outer leg and the third outer leg, and between the second outer leg and the fourth outer leg. The outer leg gap parts may comprise: an adhesive; and a plurality of spherical fillers dispersed in the adhesive.

16 Claims, 4 Drawing Sheets

(56) References Cited

FOREIGN PATENT DOCUMENTS

| | | | | |
|---|---|---|---|---|
| JP | 2005-19716 | A | | 1/2005 |
| JP | 2009-94328 | A | | 4/2009 |
| JP | 2012191139 | A | * | 10/2012 |
| JP | 2015-201581 | A | | 11/2015 |
| KR | 10-2018-0124009 | A | | 11/2018 |

OTHER PUBLICATIONS

International Search Report dated Jun. 7, 2021 in International Application No. PCT/KR2021/002236.

* cited by examiner

MAGNETIC CORE AND MAGNETIC ELEMENT COMPRISING SAME

CROSS-REFERENCE TO RELATED APPLICATIONS

This application is the U.S. national stage application of International Patent Application No. PCT/KR2021/002236, filed Feb. 23, 2021, which claims the benefit under 35 U.S.C. § 119 of Korean Application No. 10-2020-0025405, filed Feb. 28, 2020, the disclosures of each of which are incorporated herein by reference in their entirety.

TECHNICAL FIELD

The present disclosure relates to a magnetic core capable of precisely maintaining the size of a gap and a magnetic element including the same.

BACKGROUND ART

A magnetic core is an essential component for the functioning of a magnetic circuit for providing a passage for magnetic flux in a magnetic element, such as a transformer or an inductor. Such a magnetic element constitutes an electromagnetic interference (EMI) filter or is widely used for a DC-DC converter for electric vehicles, hybrid electric vehicles, and the like, which have recently been extensively researched and developed.

FIG. 1 is a block diagram showing an example of the configuration of a general DC-DC converter.

Referring to FIG. 1, the DC-DC converter 10 may be disposed between a first battery (Batt 1) 20 and a second battery (batt 2) 30, and may include a drive circuit 11, a transformer 12, and an output circuit 13.

The first battery 20 may output DC voltage and DC current, and the transformer 12 may convert AC voltage and AC current. Accordingly, the drive circuit 11 may convert DC current output by the first battery 20 into AC current, which changes over time, and may supply the AC current to a primary coil of the transformer 12 such that the AC current is input to the transformer 12. To this end, the drive circuit 11 may include a plurality of drive switches constituting a full bridge, and each drive switch may be operated under the control of a controller 40.

The transformer 12 receives AC power from the drive circuit 11, steps the AC power up or down so as to correspond to the voltage difference between the first battery 20 and the second battery 30, and outputs the converted power to a secondary coil. In addition, the output circuit 13 may convert AC current output from the transformer 12 into DC current, and may transmit the DC current to the second battery 30. In addition to this function, the transformer 12 also functions to electrically isolate circuits respectively connected to input terminals and output terminals of the transformer.

The magnetic core of the transformer 12 generally includes a Mn—Zn-based ferrite component, and thus may be referred to as a ferrite core. The efficiency of the transformer 12 varies depending on changes in the magnetic flux density of the ferrite core, lost energy is converted into thermal energy, and the thermal energy is released. With regard to the aforementioned DC-DC converter 10 and many other devices to which a magnetic element including a ferrite core is applied, there are demands for miniaturization and reduction in the amount of heat that is generated from the ferrite core during operation. However, since there is a trade-off relationship between the size of the ferrite core and the reduction in the amount of heat that is generated, it is difficult to meet electrical performance requirements only through reducing the size of the ferrite core. Therefore, as an alternative to reducing the size of the ferrite core, it is necessary to modify the shape or structure of the ferrite core.

As an alternative thereto, when a magnetic core is composed of two or more core parts, a gap may be formed between center legs or outer legs of the core parts that face each other in order to control heat generation and inductance.

However, in the case in which a center gap is formed only between the center legs, the center gap can be easily formed simply by cutting the center legs, but this entails a problem in that heat is concentrated in the center legs. In order to solve this problem, a method of additionally forming an external gap between the outer legs has been proposed. In this case, however, it is difficult to control the size of the gap.

DISCLOSURE

Technical Problem

The present disclosure has been made in order to solve the above problems with the conventional art, and provides a magnetic core that has excellent heat generation characteristics and can be reduced in size and a magnetic element including the same.

In particular, the present disclosure provides a magnetic core capable of precisely maintaining the size of a gap between outer legs and a magnetic element including the same.

The objects to be accomplished by the disclosure are not limited to the above-mentioned objects, and other objects not mentioned herein will be clearly understood by those skilled in the art from the following description.

Technical Solution

In order to accomplish the above objects, a magnetic core according to an embodiment of the present disclosure may include an upper core having at least a first outer leg and a second outer leg, a lower core having at least a third outer leg facing the first outer leg and a fourth outer leg facing the second outer leg, and an outer-leg gap portion disposed in each of a region between the first outer leg and the third outer leg and a region between the second outer leg and the fourth outer leg. The outer-leg gap portion may include an adhesive and a plurality of spherical fillers disposed in the adhesive in a distributed form.

In an example, the plurality of spherical fillers may not overlap each other in the thickness direction in the outer-leg gap portion.

In an example, the upper limit of the content of the spherical fillers in the outer-leg gap portion may be determined in consideration of the planar area of the outer-leg gap portion with respect to the adhesive force of the adhesive, and the lower limit of the content of the spherical fillers in the outer-leg gap portion may be determined in consideration of the length of a short side of each of the first outer leg, the second outer leg, the third outer leg, and the fourth outer leg and the diameters of the spherical fillers.

In an example, the spherical fillers may occupy 0.2% to 50% of the planar area of the outer-leg gap portion.

In an example, the upper core may further include a first center leg, the lower core may further include a second center leg facing the first center leg, and the first center leg and the second center leg may form a center gap therebetween.

In addition, a magnetic element according to an embodiment may include a magnetic core and at least one coil. The magnetic core may include an upper core having at least a first outer leg and a second outer leg, a lower core having at least a third outer leg facing the first outer leg and a fourth outer leg facing the second outer leg, and an outer-leg gap portion disposed in each of a region between the first outer leg and the third outer leg and a region between the second outer leg and the fourth outer leg. The outer-leg gap portion may include an adhesive and a plurality of spherical fillers disposed in the adhesive in a distributed form.

Advantageous Effects

The effects of the magnetic core according to the present disclosure will be described below.

First, since a spherical filler is provided in an external gap, it is possible to accurately control the size of the external gap by changing the diameter of the filler.

Second, the size of a center gap may also be maintained through accurate maintenance of the size of the external gap. Accordingly, a target inductance value may be realized, heat may be uniformly generated throughout the magnetic core, and the size thereof may be reduced through control of heat generation.

The effects achievable through the disclosure are not limited to the above-mentioned effects, and other effects not mentioned herein will be clearly understood by those skilled in the art from the following description.

DESCRIPTION OF DRAWINGS

The accompanying drawings are included to provide a further understanding of the disclosure and illustrate embodiments of the disclosure together with the detailed description. However, the technical features of the disclosure are not limited to specific drawings, and the features shown in the drawings may be combined to construct a new embodiment.

BEST MODE

Hereinafter, devices and methods to which embodiments of the present disclosure are applied will be described in detail with reference to the accompanying drawings. The suffixes "module" and "unit" used herein to describe configuration components are assigned or used in consideration only of convenience in creating this specification, and the two suffixes themselves do not have any distinguished meanings or roles from each other.

In the following description of the embodiments, it will be understood that, when each element is referred to as being formed "on" or "under" and "ahead of" or "behind" another element, it can be directly "on" or "under" and "ahead of" or "behind" the other element, or can be indirectly formed with one or more intervening elements therebetween.

Additionally, terms such as "first", "second", "A", "B", "(a)", "(b)", etc. may be used herein to describe the components of the embodiments. These terms are only used to distinguish one element from another element, and the essence, order, or sequence of corresponding elements is not limited by these terms. It should be noted that if it is described in the specification that one component is "connected", "coupled", or "joined" to another component, the former may be directly "connected", "coupled", or "joined" to the latter, or may be indirectly "connected", "coupled", or "joined" to the latter via another component.

Additionally, the term "comprises", "includes", or "has" described herein should be interpreted not to exclude other elements but to further include such other elements since the corresponding elements may be inherent unless mentioned otherwise. Unless otherwise defined, all terms used herein, which include technical or scientific terms, have the same meanings as those generally appreciated by those skilled in the art. Terms such as those defined in common dictionaries should be interpreted as having the same meanings as terms in the context of the pertinent technology, and should not be interpreted as having ideal or excessively formal meanings unless clearly defined in the specification.

Hereinafter, a magnetic core according to the embodiment will be described in detail with reference to the accompanying drawings.

Figure 1:
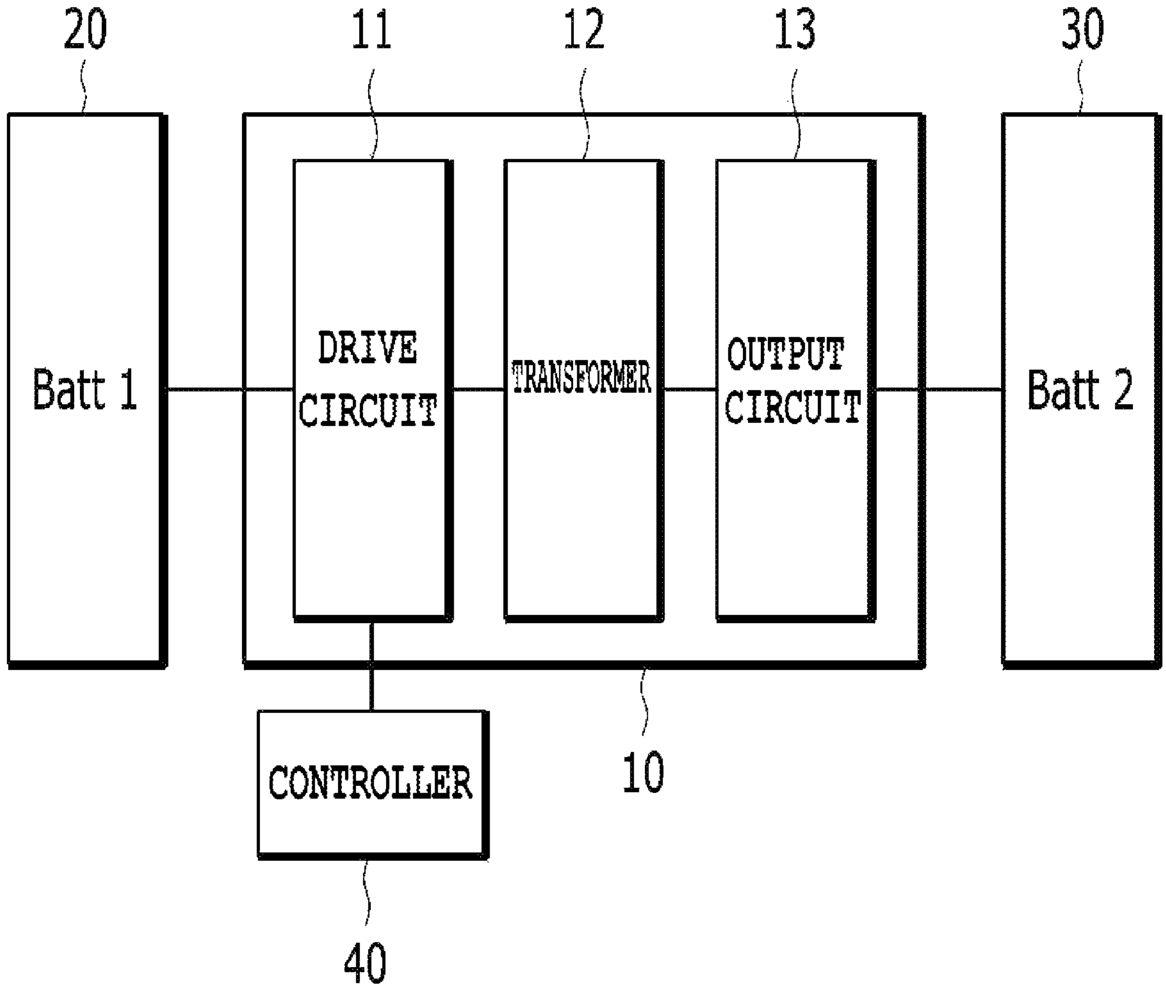
FIG. 1 is a block diagram showing an example of the configuration of a general DC-DC converter.
Figure 2A:
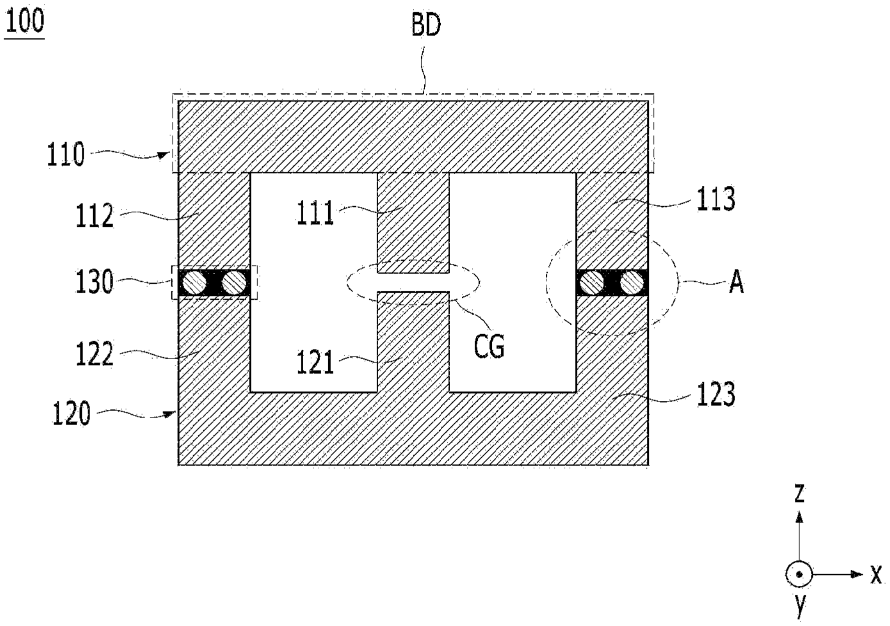
FIG. 2A shows an example of the configuration of a magnetic core according to an embodiment.

FIG. 2A shows an example of the configuration of a magnetic core according to an embodiment.

Referring to FIG. 2A, the magnetic core 100 according to the embodiment may include an upper core 110, which is coupled from above, and a lower core 120, which is coupled from below. The upper core 110 and the lower core 120 may be vertically symmetrical with each other, or may be asymmetrical. For convenience of explanation, the following description will be made on the assumption that the upper core and the lower core are symmetrical with each other.

Each of the upper core 110 and the lower core 120 may include a magnetic material, for example iron or ferrite, but the disclosure is not limited thereto.

At least one of the upper core 110 or the lower core 120 that constitute the magnetic core 100, for example, the upper core 110, may include a body BD, which has a flat plate shape, and a plurality of legs 111, 112, and 113, which protrude from the body BD in a thickness direction (i.e. the −Z-axis direction) and extend in a predetermined direction. The plurality of legs may include two outer legs 112 and 113, which extend in the direction of one axis (here, the y-axis direction) and are spaced apart from each other in the direction of another axis (here, the x-axis direction) on a plane, and one center leg 111, which is disposed between the two outer legs 112 and 113.

Similarly, the lower core 120 may also include two outer legs 122 and 123 and one center leg 121 disposed therebetween.

Each of the upper core 110 and the lower core 120 having the above configurations may be referred to as an "E"-type core according to the external appearance thereof.

The lower surface of the center leg 111 of the upper core 110 and the upper surface of the center leg 121 of the lower core 120 may face each other with a predetermined gap therebetween in the thickness direction. The gap between the center legs 111 and 121 may be referred to as a center gap CG.

In addition, an outer-leg gap portion 130 may be disposed between each pair of outer legs facing each other, for example, in each of the region between one outer leg 112 of the upper core 110 and one outer leg 122 of the lower core 120 and the region between the other outer leg 113 of the upper core 110 and the other outer leg 123 of the lower core 120. The concrete configuration of the outer-leg gap portion 130 will be described with reference to FIG. 2B.

Figure 2B:
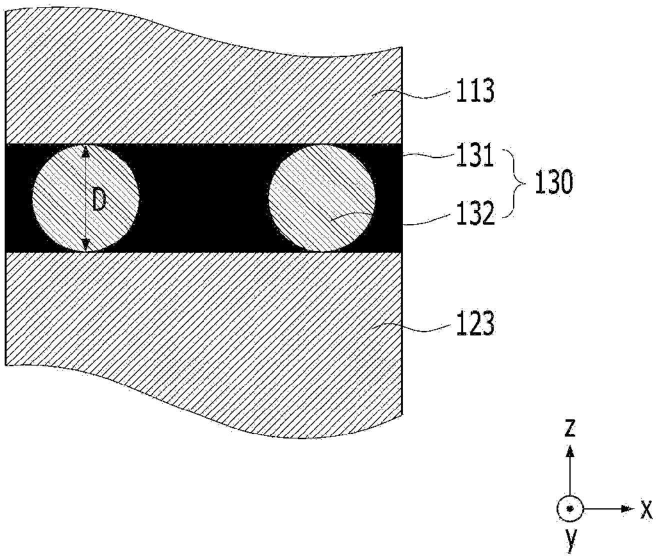
FIG. 2B is an enlarged view of portion 'A' in FIG. 2A.

FIG. 2B is an enlarged view of portion 'A' in FIG. 2A.

Referring to FIG. 2B, the outer-leg gap portion 130 may include an adhesive 131 and a plurality of fillers 132. The adhesive 131 may include a component that is used for bonding of a general ferrite core, for example, an epoxy resin, but the disclosure is not limited thereto.

Each of the fillers 132 may have a spherical shape, and may include an insulating material, such as zirconia, or may include conductive metal. Each of the fillers 132 may be disposed so as not to overlap the other fillers in the thickness direction in the outer-leg gap portion 130. That is, the fillers 132 may be disposed parallel to each other in a single layer in the outer-leg gap portion 130.

In this case, the diameter D of the filler 132 corresponds to the size of an external gap formed by the outer-leg gap portion 130, that is, the distance between the lower surface of one outer leg 113 of the upper core 110 and the upper surface of one outer leg 123 of the lower core 120. Accordingly, in the magnetic core 100 according to the embodiment, it is possible to precisely maintain the size of the external gap, which is determined in consideration of a target inductance or the like, by changing the diameter of the filler 132.

If the lengths of all of the outer legs and the center legs are equal in the Z-axis direction, both the size of the center gap CG and the size of the external gap may correspond to the diameter D of the filler 132. Depending on the length to which the center legs are cut, the size of the center gap CG may be greater than the diameter D of the filler 132. Accordingly, in the magnetic core 100 according to the embodiment, it is possible to freely and accurately change the sizes of the center gap CG and the external gap depending on the diameter D of the filler 132, thus easily achieving a target inductance. In addition, the magnetic core can be manufactured with a low tolerance, and thus the yield and reliability thereof are increased.

In order to manufacture the magnetic core 100 according to the embodiment, the upper core 110 and the lower core 120 may be prepared, a gap glue formed such that the plurality of fillers 132 are distributed in the adhesive 131 may be applied in each of the region between the pair of outer legs 112 and 122 and the region between the pair of outer legs 113 and 123, and the gap glue may be cured in the state in which the upper core and the lower core are pressed in the vertical direction. In the course of pressing, the positions of the fillers may be adjusted such that one filler does not overlap the other fillers in the thickness direction. In addition, in order to control the thickness of the outer-leg gap portion 130 according to the embodiment, that is, the size of the external gap, so as to correspond to the diameter D of the filler 132, it is preferable for the filler 132 to have a rigidity sufficient to inhibit deformation thereof due to pressure applied thereto in the vertical direction or to allow the height thereof to change within a predetermined range (e.g. 5%) after the pressure is applied thereto.

If the filler 132 includes a conductive material, the upper core 110 and the lower core 120 are in an electrically shorted state due to the filler 132. In this case, when the magnetic core 100 is used in a transformer in which there is a large difference between the voltage of a primary coil and the voltage of a secondary coil, a potential difference between parasitic capacitance components generated between the upper core 110 and one coil and between the lower core 120 and the other coil may be eliminated. Accordingly, it is possible to inhibit the occurrence of an arc discharge phenomenon due to a large potential difference.

Next, the content of the fillers 132 in the outer-leg gap portion 130 will be described with reference to FIGS. 3A and 3B.

Figure 3A:
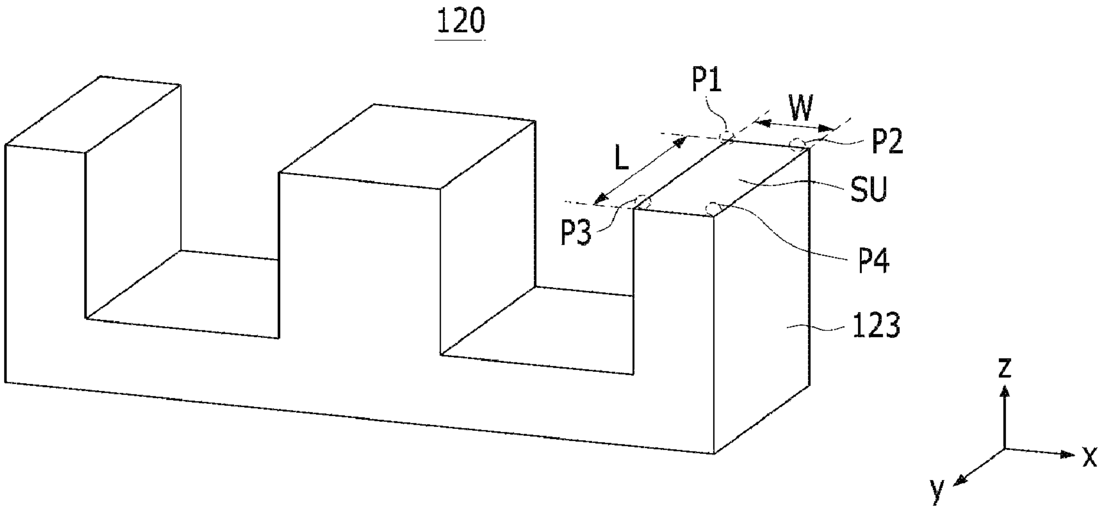
FIG. 3A is a perspective view showing an example of the configuration of a lower core according to an embodiment.
Figure 3B:
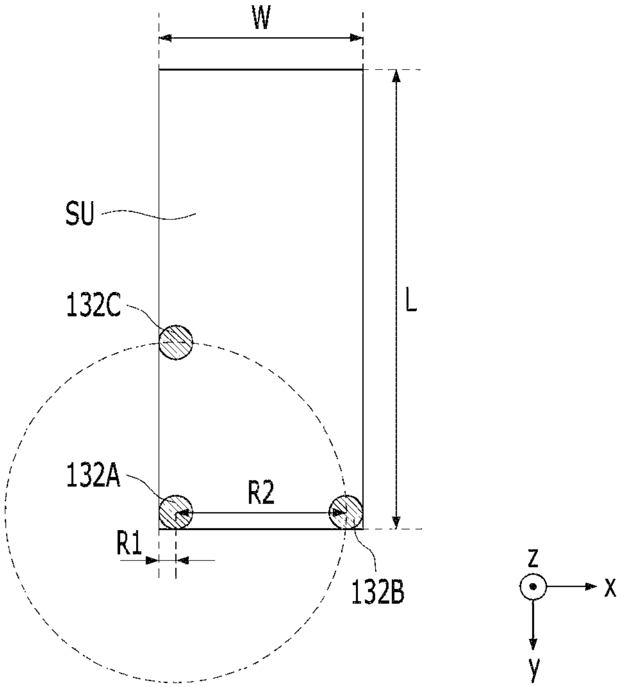
FIG. 3B shows an example of disposition of fillers for provision of minimum required support on the section of an outer leg according to an embodiment.

FIG. 3A is a perspective view showing an example of the configuration of the lower core according to an embodiment, and FIG. 3B shows an example of disposition of the fillers for provision of minimum required support on the section of the outer leg according to an embodiment.

Referring to FIG. 3A, one outer leg 123 of the lower core 120 is formed in the shape of a rectangular column that has a rectangular-shaped plane such that the upper surface SU thereof has a width W and a length L. When the magnetic core 100 according to the embodiment is constructed, the outer-leg gap portion 130 is disposed on the upper surface SU of the outer leg 123, and the lower surface of the outer leg 113 of the upper core 110, which is opposite the outer leg 123, is disposed on the outer-leg gap portion 130. Here, the theoretical minimum number of fillers 132 for enabling the outer-leg gap portion 130 to support the outer leg 113 of the upper core 110 while inhibiting distortion of the outer leg 113 is four, and the four fillers 132 are disposed on four respective corners P1, P2, P3, and P4 of the upper surface SU of the outer leg 123. However, this is an ideal distribution form. In practice, for support, it is necessary to dispose at least two fillers in the direction in which the short side (i.e. corresponding to "W") of the upper surface SU extends.

For example, assuming that the width W of the upper surface SU is 4.25 mm, that the length L thereof is 28 mm, and that the target size of the external gap is 100 μm, the planar area of the outer-leg gap portion 130 to be disposed on the upper surface SU is 119 $mm^2$, and the thickness of the outer-leg gap portion 130, that is, the diameter D of the filler 132, is 100 μm.

In this case, assuming that the minimal adhesive force required to ensure stable coupling between the upper core 110 and the lower core 120 is 100 $kg/cm^2$ and that the adhesive force of the adhesive 131 including an epoxy component is 200 $kg/cm^2$, if the ratio of the planar area of the adhesive 131 to the total planar area of the outer-leg gap portion 130 is about 50% or more, stable coupling can be ensured. That is, when the planar area occupied by the fillers 132 is 50% or less of 119 $mm^2$, which is the planar area of the outer-leg gap portion 130, the upper core 110 and the lower core 120 can be stably coupled.

Meanwhile, the planar area occupied by one filler 132 having a diameter of 100 μm is 0.007850 $mm^2$ (=0.05×0.05×3.14).

As shown in FIG. 3B, in order to reliably support the upper core 110, the short side W of the upper surface SU is formed such that the value obtained by subtracting 50 μm, which is the left radius R1 of the filler 132A located on the left-lower corner, and 50 μm, which is the right radius of the filler 132B located on the right-lower corner, from the length of the short side W is 4.15 μm. This length corresponds to a radius R2 defining a sector-shaped unit region for minimum required support. Further, in order to reliably support the corresponding unit region, at least three fillers 132A, 132B, and 132C are provided. The area of the sector-shaped unit region having a radius R2 of 4.15 mm is 13.5 $mm^2$ (=4.15×4.15×3.14/4), and the value obtained by dividing the planar area of the outer-leg gap portion 130 by the area of the unit region is about 8.8 (i.e. 119 $mm^2$/13.5 $mm^2$). Accordingly, the number of fillers 132 that need to be provided for minimum required support in the outer-leg gap portion 130 is 26.4 (=8.8*3), and the planar area of 26.4 fillers is 0.207 $mm^2$ (=0.00785 $mm^2$×26.4).

Consequently, when the fillers occupy a planar area of 0.207 $mm^2$ in the planar area of 119 $mm^2$, the core can be supported. This content of the fillers corresponds to 0.17%, that is, about 0.2%.

In summary, the upper limit of the content of the fillers in the outer-leg gap portion 120 is about 50% from the aspect of required adhesive force, and the lower limit thereof is about 0.2% from the aspect of support of the core. That is, the content of the fillers in the outer-leg gap portion 120 may range from 0.2% to 50%.

However, this content is calculated based on the adhesive force of the epoxy-based adhesive 131 and the ratio of the diameter of the filler to the planar area of the outer leg. Therefore, it will be apparent to those skilled in the art that the content can vary depending on the components of the adhesive, the target size of the external gap, and the shape and the size of the planar area of the outer leg.

Next, the advantages of the magnetic core according to the embodiment compared to a comparative example will be described with reference to FIG. 4.

Figure 4:
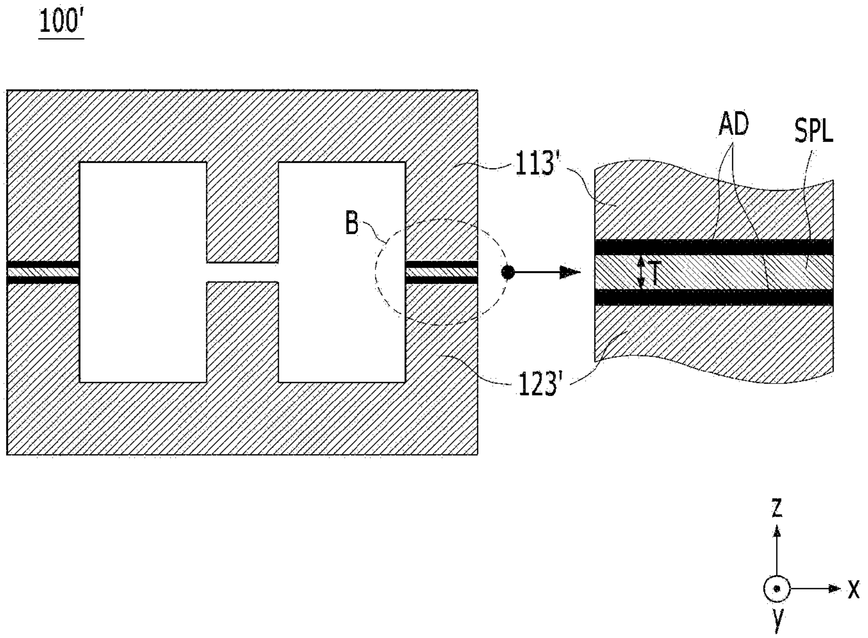
FIG. 4 shows an example of the configuration of a core according to a comparative example.

FIG. 4 shows an example of the configuration of a core according to a comparative example.

The left drawing in FIG. 4 shows a magnetic core 100' according to a comparative example, and the right drawing in FIG. 4 is an enlarged view of portion B, corresponding to a pair of outer legs 113' and 123'. In the magnetic core 100' according to the comparative example, a spacer layer SPL, which has adhesives AD applied to the upper and lower surfaces thereof, is disposed between the pair of outer legs 113' and 123' facing each other in order to form an external gap. That is, in order to manufacture the magnetic core 100' according to the comparative example, the adhesives AD are applied to the end surfaces of each pair of outer legs that face each other, the spacer layer SPL is inserted between each pair of outer legs, and the magnetic core is pressed.

However, the thickness of the adhesive AD may vary depending on the extent to which the magnetic core is pressed. Further, because the spacer layer SPL is generally embodied as a polyimide film, the spacer layer SPL may be compressed when the magnetic core is pressed, thus making it difficult to accurately form an external gap having a desired size. Furthermore, because the spacer layer SPL takes the form of a single sheet corresponding to the planar shape of the outer leg, the spacer layer SPL may escape from the region between a pair of outer legs during a manufacturing process, thus marring the external appearance or, in severe cases, failing to satisfy target specifications.

In contrast, in the magnetic core 100 according to the embodiment, since the thickness of the outer-leg gap portion 130 is determined depending on the diameter D of the filler 132, there is little concern about tolerances or a defective external appearance during a manufacturing process, and it is possible to accurately realize an external gap having any of various sizes by controlling the diameter of the filler 132.

Meanwhile, although the magnetic core 100 composed of two E-type cores has been described above, it will be apparent to those skilled in the art that the above description may also apply to the case in which the magnetic core is configured as a combination of an I-type core and an E-type core or a combination of three or more cores depending on the type of magnetic element to be manufactured. Furthermore, the magnetic core 100 according to the embodiment may also be applied to a transformer, an inductor, and any other magnetic elements to which a magnetic core including a gap is applied through combination with a coil.

The technical contents of the above-described embodiments may be combined into various forms as long as they are not incompatible with one another, and thus may be implemented in new embodiments.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

The invention claimed is:

1. A magnetic core, comprising:

an upper core having at least a first outer leg and a second outer leg;

a lower core having at least a third outer leg facing the first outer leg and a fourth outer leg facing the second outer leg; and an outer-leg gap portion disposed in each of a region between the first outer leg and the third outer leg and a region between the second outer leg and the fourth outer leg, wherein the outer-leg gap portion comprises:

an adhesive; and a plurality of spherical fillers disposed in the adhesive in a distributed form, wherein the plurality of spherical fillers are made of a conductive material, making the upper core and the lower core be in an electrically shorted state wherein the spherical fillers are disposed in parallel to each other in a single layer and do not overlap each other in a thickness direction of the layer in the outer-leg gap portion.

2. The magnetic core according to claim 1, wherein an upper limit of a content of the spherical fillers in the outer-leg gap portion is determined in consideration of a planar area of the outer-leg gap portion with respect to an adhesive force of the adhesive, and wherein a lower limit of the content of the spherical fillers in the outer-leg gap portion is determined in consideration of a length of a short side of each of the first outer leg, the second outer leg, the third outer leg, and the fourth outer leg and diameters of the spherical fillers.

3. The magnetic core according to claim 1, wherein the spherical fillers occupy 0.2% to 50% of a planar area of the outer-leg gap portion.

4. The magnetic core according to claim 1, wherein the upper core comprises a first center leg, wherein the lower core comprises a second center leg facing the first center leg, and wherein the first center leg and the second center leg form a center gap therebetween.

5. The magnetic core according to claim 4, wherein a length of the center gap is larger than a diameter of each of the plurality of spherical fillers.

6. The magnetic core according to claim 4, wherein a length of at least one of the first center leg and the second center leg is shorter than lengths of the first outer leg, the second outer leg, the third outer leg, and the fourth outer leg in a vertical direction.

7. A magnetic element, comprising:

a magnetic core; and at least one coil, wherein the magnetic core comprises:

an upper core having at least a first outer leg and a second outer leg;

a lower core having at least a third outer leg facing the first outer leg and a fourth outer leg facing the second outer leg; and an outer-leg gap portion disposed in each of a region between the first outer leg and the third outer leg and a region between the second outer leg and the fourth outer leg, wherein the outer-leg gap portion comprises:

an adhesive; and a plurality of spherical fillers disposed in the adhesive in a distributed form, wherein the plurality of spherical fillers are made of a conductive material, making the upper core and the lower core be in an electrically shorted state wherein the spherical fillers are disposed in parallel to each other in a single layer and do not overlap each other in a thickness direction of the layer in the outer-leg gap portion.

8. The magnetic core according to claim 4, wherein sizes of the outer-leg gap portion and the center gap are determined depending on diameters of the spherical fillers.

9. The magnetic core according to claim 1, wherein the adhesive includes an epoxy resin.

10. The magnetic core according to claim 1, wherein each of the spherical filler includes an insulating material.

11. The magnetic core according to claim 1, wherein a diameter of each of the spherical fillers is determined in consideration of a target inductance.

12. The magnetic core according to claim 1, wherein a diameter of each of the spherical fillers corresponds to either a distance between a lower surface of the first outer leg and an upper surface of the third outer leg or a distance between a lower surface of the second outer leg and an upper surface of the fourth outer leg.

13. The magnetic core according to claim 1, wherein each of the spherical fillers has a rigidity to allow a height thereof to change within a predetermined range due to pressure applied thereto in a vertical direction.

14. The magnetic core according to claim 1, wherein at least one of the third or fourth outer leg is formed in a shape of a rectangular column.

15. The magnetic core according to claim 1, wherein the spherical fillers include at least two fillers disposed in a direction in which a short side of an upper surface of at least one of the third or fourth outer leg extends.

16. The magnetic core according to claim 1, wherein a ratio of a planar area of the adhesive to a planar area of the outer-leg gap portion is about 50% or more.

* * * * *